US011548622B2

(12) United States Patent
Tian

(10) Patent No.: US 11,548,622 B2
(45) Date of Patent: Jan. 10, 2023

(54) AIRCRAFT LANDING GEAR

(71) Applicant: Shanghai Autoflight Co., Ltd., Kunshan (CN)

(72) Inventor: Yu Tian, Hong Kong SAR (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

(21) Appl. No.: 17/827,535

(22) Filed: May 27, 2022

(65) Prior Publication Data

US 2022/0388634 A1 Dec. 8, 2022

(30) Foreign Application Priority Data

May 27, 2021 (CN) .......................... 202121162414.6

(51) Int. Cl.
B64C 25/10 (2006.01)
B64C 25/36 (2006.01)

(52) U.S. Cl.
CPC .............. B64C 25/10 (2013.01); B64C 25/36 (2013.01)

(58) Field of Classification Search
CPC ...... B64C 25/10; B64C 25/36; B64D 45/0005
See application file for complete search history.

(56) References Cited

U.S. PATENT DOCUMENTS

| 2,487,405 | A | * | 11/1949 | Andrews | B64C 25/10 244/102 R |
| 2,565,007 | A | * | 8/1951 | Van Zelm | B64C 25/10 244/102 R |
| 2009/0095839 | A1 | * | 4/2009 | Lassus | F15B 15/204 244/102 R |
| 2013/0112808 | A1 | * | 5/2013 | Guering | B64C 25/22 244/102 SS |
| 2020/0207463 | A1 | * | 7/2020 | Schuster | B64C 25/26 |

* cited by examiner

Primary Examiner — Rodney A Bonnette
(74) Attorney, Agent, or Firm — WPAT Law, P.C.; Anthony King

(57) ABSTRACT

An aircraft having a fuselage and a front landing gear; both sides of the rear bottom of the fuselage are fixedly connected with the rear landing gear; one end of the front landing gear is rotatably connected to the front bottom of the fuselage. When the front landing gear rotates to the first position, the second position and the third position, the connecting line between the end of the front landing gear away from the fuselage and the end of the rear landing gear away from the fuselage intersects with the plane, where the fuselage is located, on the side close to the front of the fuselage, parallel to and intersect on the side close to the rear of the fuselage.

14 Claims, 2 Drawing Sheets

Figure(s) of the Specifications

AIRCRAFT LANDING GEAR

TECHNICAL FIELD

The application relates to the technical field of aircraft, in particular to an aircraft.

BACKGROUND ART

When the existing small aircraft is not working, the plane where the fuselage is located is parallel to the ground, and because the small aircraft is relatively low and small, the users often need to stoop to avoid the canard wing in front of the fuselage when entering and leaving the cabin at the bottom of the fuselage, which causes inconvenience to the users. At the same time, the above problems also affect the access efficiency of the users and cause hidden dangers in safety.

SUMMARY OF THE APPLICATION

The purpose of the application is to provide an aircraft to solve the problem of cumbersome actions of users entering and leaving the aircraft from the front.

To achieve this purpose, the application adopts the following technical solution:

An aircraft, comprising a fuselage and a front landing gear. Both sides of the rear bottom of the fuselage are fixedly connected to rear landing gear. A front landing gear is provided in the quantity of at least one, and one end of the front landing gear is rotatably connected to the front bottom of the fuselage. When the front landing gear rotates to the first position, the connecting line of the front landing gear away from the fuselage and the rear landing gear away from the fuselage intersects with the plane, where the fuselage is located, on the side close to the front of the fuselage. When the front landing gear rotates to the second position, the connecting line between the end of the front landing gear away from the fuselage and the end of the rear landing gear away from the fuselage is parallel to the plane where the fuselage is located. When the front landing gear rotates to the third position, the connecting line between the end of the front landing gear away from the fuselage and the end of the rear landing gear away from the fuselage intersects with the plane, where the fuselage is located, on the side close to the rear of the fuselage.

Wherein, when the front landing gear rotates to the first position, the end of the front landing gear away from the fuselage is located at the limit position close to the fuselage.

When the front landing gear rotates to the third position, the end of the front landing gear away from the fuselage is located at the limit position away from the fuselage.

The front landing gear is provided in the quantity of two, and the two front landing gears are rotatably connected to both sides of the front bottom of the fuselage, respectively.

The front landing gear is rotatably connected to a driving member, which is used to drive the front landing gear to rotate.

The driving member comprises a hydraulic telescopic rod.

The aircraft also includes a control component, which is used to control the hydraulic telescopic rod.

The aircraft also includes a detection component, which is used to detect the position of the front landing gear relative to the fuselage.

The end of the front landing gear away from the fuselage is rotatably connected to a front wheel.

The end of the rear landing gear away from the fuselage is rotatably connected to a rear wheel.

The beneficial effects of the application are as follows:

The adjustment to the position of the front landing gear relative to the fuselage improves the structure of the aircraft and facilitates the use by users; rotating the front landing gear to the first position enables the front landing gear to be retracted to the position close to the fuselage, reducing the risk of damage to the front landing gear during flight. Rotating the front landing gear to the second position enables the aircraft to bear the force evenly in the process of taking off and landing, so as to ensure the safety of taking off and landing. Rotating the front landing gear to the third position enables the front of the fuselage to be lifted to facilitate operators to enter and leave the aircraft from the front of the aircraft.

Wherein, 100. Fuselage; 110. Front landing gear; 111. Front wheel; 112. Driving member; 120. Rear landing gear; 130. Cabin.

DETAILED DESCRIPTION

In order to make clearer the technical problems solved, the technical solution adopted and the technical effect achieved by the application, the technical solution of the embodiment of the application will be further described in detail below in combination with the attached figures. Obviously, the described embodiments are only part of the embodiments of the application, not all of the embodiments. Based on the embodiments of the application, all other embodiments obtained by those skilled in the art without creative work fall within the breadth and scope of the application.

In the description of the application, it should be noted that unless otherwise specified and limited, the terms, "connect", "connection", and "fixation" should be understood in a broad sense. For example, it can be fixedly connected, detachably connected, or integrated. It can be mechanical connection or electrical connection. It can be connected directly or indirectly through an intermediate medium, and it can be the connection between the two components. For those skilled in the art, the specific meaning of the above terms in the application can be understood in specific circumstances.

In the application, unless otherwise clearly specified and limited, the first feature "on" or "under" the second feature may include the direct contact between the first and second features, or the contact between the first and second features that is not direct contact, but through another feature between them. Moreover, the first feature "on", "over", and "above" the second feature may include the first feature directly above and obliquely above the second feature, or only indicates that the horizontal height of the first feature is higher than the second feature. The first feature "under", "below" and "beneath" the second feature, may include the first feature directly below and obliquely below the second feature, or only indicate that the horizontal height of the first feature is smaller than that of the second feature.

The technical solution of the application is further described below in combination with the figures and through the embodiments.

Figure 1:
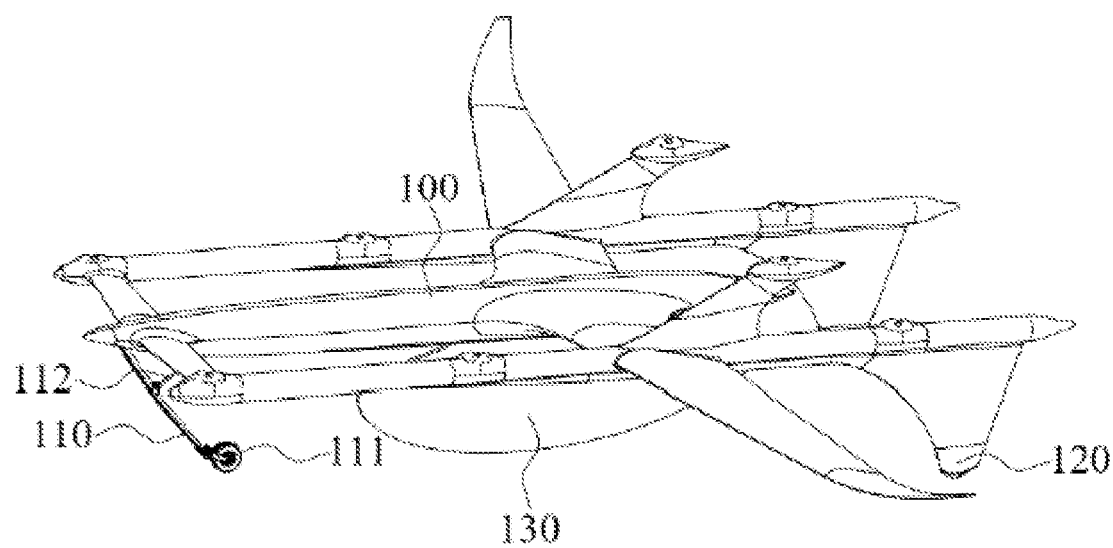
FIG. 1 is the structural diagram of the aircraft provided by the embodiment of the application.
Figure 2:
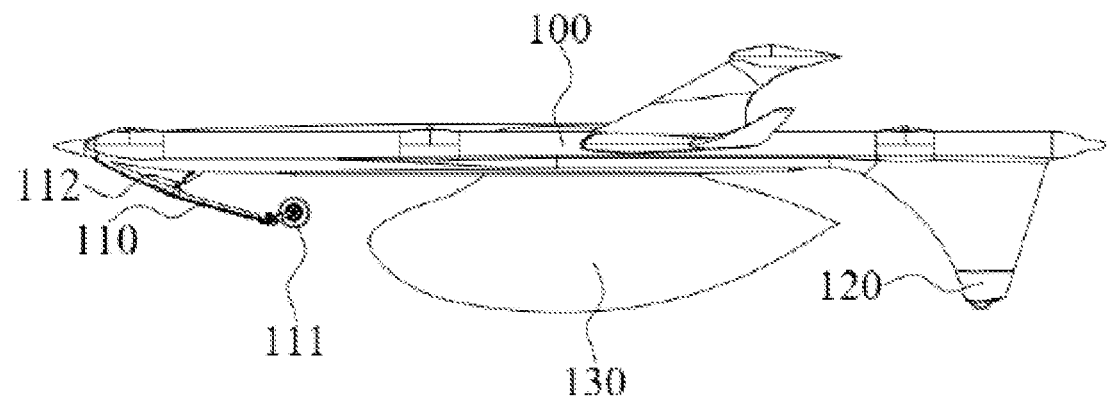
FIG. 2 is a side view of the aircraft when the front landing gear is in the first position provided by the embodiment of the application.
Figure 3:
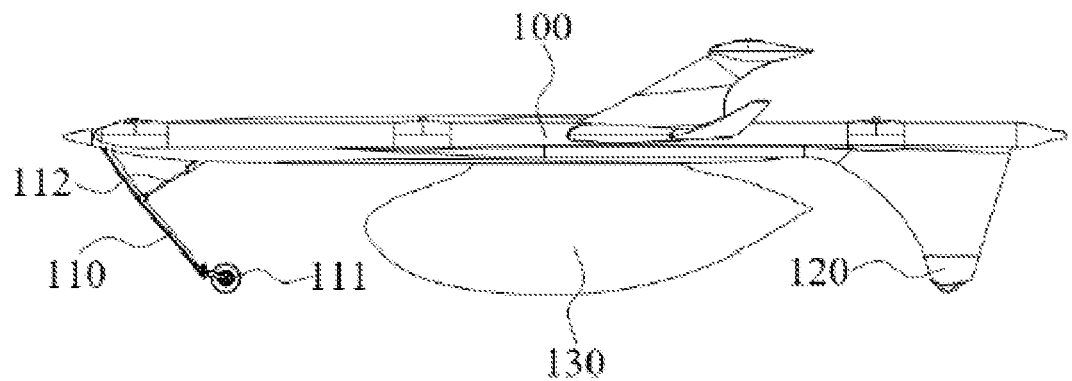
FIG. 3 is a side view of the aircraft when the front landing gear is in the second position provided by the embodiment of the application.
Figure 4:
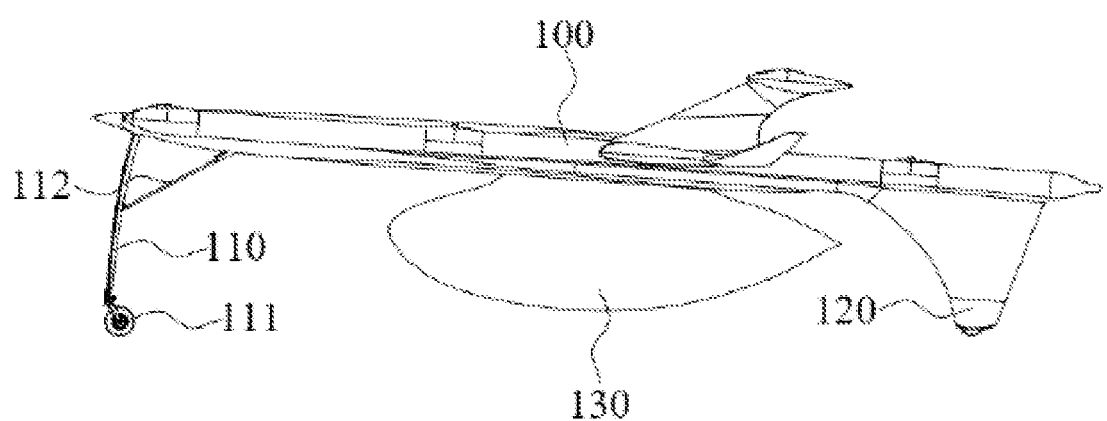
FIG. 4 is a side view of the aircraft when the front landing gear is in the third position provided by the embodiment of the application.

As shown in FIG. 1-FIG. 4, the present embodiment provides an aircraft, including a fuselage 100 and a front landing gear 110; both sides of the rear bottom of the fuselage 100 are fixedly connected to the rear landing gear 120. The front landing gear 110 is provided, in the quantity of at least one, and one end of the front landing gear 110 is rotatably connected to the front bottom of the fuselage 100. When the front landing gear 110 rotates to the first position, the connecting line between the end of the front landing gear 110 away from the fuselage 100 and the end of the rear landing gear 120 away from the fuselage 100 intersects with the plane, where the fuselage 100 is located, on the side close to the front of the fuselage 100. When the front landing gear 110 rotates to the second position, the connecting line between the end of the front landing gear 110 away from the fuselage 100 and the end of the rear landing gear 120 away from the fuselage 100 is parallel to the plane where the fuselage 100 is located. When the front landing gear 110 rotates to the third position, the connecting line between the end of the front landing gear 110 away from the fuselage 100 and the end of the rear landing gear 120 away from the fuselage 100 intersects with the plane, where the fuselage is located, on the side close to the rear of the fuselage 100. A cabin 130 is also arranged at the bottom of the fuselage 100 for accommodating users. The adjustment to the position of the landing gear 110 relative to the fuselage 100 improves the structure of the aircraft and facilitates the use by users. Rotating the front landing gear 110 to the first position enables the front landing gear 110 to be retracted to a position close to the fuselage 100, reducing the risk of damage to the front landing gear 110 during flight. Rotating the front landing gear 110 to the second position enables the aircraft to be bear the stress evenly during takeoff and landing, ensuring the safety of aircraft takeoff and landing steps. Rotating the front landing gear 110 to the third position enables the front of the fuselage 100 to be lifted, facilitating the user to enter and leave the aircraft from the front of the aircraft. When the front landing gear 110 rotates to the first position, the end of the front landing gear 110 away from the fuselage 100 is located at the limit position close to the fuselage 100. When the front landing gear 110 rotates to the third position, the end of the front landing gear 110 away from the fuselage 100 is located at the limit position away from the fuselage 100. The fuselage 100 is fixedly connected with a limit block for defining the rotation limit position of the front landing gear 110. The above arrangement limits the rotation range of the front landing gear 110, reduces the risk of wrong position of the front landing gear 110 due to accident, lowers the probability of aircraft failure and reduces the hidden danger of safety.

In this embodiment, the front landing gear 110 is provided in the quantity of two, and the two front landing gears 110 are rotatably connected to both sides of the front bottom of the fuselage 100, respectively. The arrangement of the two front landing gears 110 improves the stress condition of the aircraft in the non-working state, thereby reducing the potential safety hazard caused by the excessive bearing capacity of the landing gear.

The front landing gear 110 is rotatably connected to a driving member 112, which is used to drive the front landing gear 110 to rotate. The driving member 112 includes a hydraulic telescopic rod. The arrangement of the driving member 112 enables the user to switch the position of the front landing gear 110 by driving the hydraulic telescopic rod, thereby greatly improving the switching efficiency of the position of the front landing gear 110.

The aircraft also includes a control component, which is used to control the hydraulic telescopic rod. The arrangement of the control component enables the adjustment of the position of the front landing gear 110 relative to the fuselage 100 to be completed through the control component, which further facilitates the user to switch the position of the front landing gear 110.

The aircraft also includes a detection component, which is used to detect the position of the front landing gear 110 relative to the fuselage 100. The arrangement of the detection component can timely feed back the position of the front landing gear 110 to the user, so as to timely send an alarm to the user in case of a wrong position of the front landing gear 110, which reduces the risk of aircraft damage and potential safety hazards of the user.

In this embodiment, the end of the front landing gear 110 away from the fuselage 100 is rotatably connected to the front wheel 111; the end of the rear landing gear 120 away from the fuselage 100 is rotatably connected to a rear wheel. The arrangement of the front wheel 111 and the rear wheel avoids the wear of the front landing gear 110 and the rear landing gear 120, and facilitates the movement and lifting of the aircraft.

Obviously, the above embodiments of the application are only for the purpose of clarifying the application, but not for the purpose of limiting the embodiments of the application. For those skilled in the art, other changes or alterations in different forms may be made on the basis of the above description. It is unnecessary and impossible to enumerate all the embodiments here. Any modification, equivalent replacement and improvement made based on the spirit and principles of the application shall fall within the breadth and scope of the claims of the application.

What is claimed is:

1. An aircraft, which is characterized by comprising:
   a fuselage (100), of which both sides at the rear bottom are fixedly connected to a rear landing gear (120);
   a front landing gear (110), provided in the quantity of at least one end of the front landing gear (110) is rotatably connected to the front bottom of the fuselage (100);
   when the front landing gear (110) rotates to the first position, the connecting line between the end of the front landing gear (110) away from the fuselage (100) and the end of the rear landing gear (120) away from the fuselage (100) intersects with the plane, where the fuselage (100) is located, on the side close to the front of the fuselage (100);
   when the front landing gear (110) rotates to the second position, the connecting line between the end of the front landing gear (110) away from the fuselage (100) and the end of the rear landing gear (120) away from the fuselage (100) is parallel to the plane where the fuselage (100) is located;
   when the front landing gear (110) rotates to the third position, the connecting line between the end of the front landing gear (110) away from the fuselage (100) and the end of the rear landing gear (120) away from the fuselage (100) intersects with the plane, where the fuselage (100) is located, on the side close to the rear of the fuselage (100); and when the front landing gear (110) rotates to the third position, the end of the front landing gear (110) away from the fuselage (100) is located at the limit position away from the fuselage (100).

2. The aircraft according to claim 1, which is characterized in that when the front landing gear (110) rotates to the first position, the end of the front landing gear (110) away from the fuselage (100) is located at the limit position close to the fuselage (100).

3. The aircraft according to claim 2, which is characterized in that the end of the front landing gear (110) away from the fuselage (100) is rotatably connected to a front wheel (111).

4. The aircraft according to claim 1, which is characterized in that the front landing gear (110) is provided in the quantity of two, and the two front landing gears (110) are rotatably connected to both sides of the front bottom of the fuselage (100), respectively.

5. The aircraft according to claim 1, which is characterized in that the front landing gear (110) is rotatably connected to a driving member (112), and the driving member (112) is used to drive the front landing gear (110) to rotate.

6. The aircraft according to claim 5, which is characterized in that the driving member (112) comprises a hydraulic telescopic rod.

7. The aircraft according to claim 6, which is characterized in that the end of the rear landing gear (120) away from the fuselage (100) is rotatably connected to a rear wheel.

8. The aircraft according to claim 5, which is characterized in that the end of the front landing gear (110) away from the fuselage (100) is rotatably connected to a front wheel (111).

9. The aircraft according to claim 1, which is characterized in that the end of the front landing gear (110) away from the fuselage (100) is rotatably connected to a front wheel (111).

10. The aircraft according to claim 1, which is characterized in that the end of the front landing gear (110) away from the fuselage (100) is rotatably connected to a front wheel (111).

11. The aircraft according to claim 1, which is characterized in that the end of the front landing gear (110) away from the fuselage (100) is rotatably connected to a front wheel (111).

12. The aircraft according to claim 1, which is characterized in that the end of the rear landing gear (120) away from the fuselage (100) is rotatably connected to a rear wheel.

13. The aircraft according to claim 1, which is characterized in that the end of the rear landing gear (120) away from the fuselage (100) is rotatably connected to a rear wheel.

14. The aircraft according to claim 1, which is characterized in that the end of the rear landing gear (120) away from the fuselage (100) is rotatably connected to a rear wheel.

* * * * *